United States Patent
Tanaka et al.

(10) Patent No.: US 10,356,527 B2
(45) Date of Patent: Jul. 16, 2019

(54) OUTPUT CONTROL DEVICE, OUTPUT CONTROL SYSTEM, AND OUTPUT CONTROL METHOD

(71) Applicant: YAMAHA CORPORATION, Hamamatsu-shi (JP)

(72) Inventors: Katsuaki Tanaka, Hamamatsu (JP); Hisashi Iida, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/841,569

(22) Filed: Dec. 14, 2017

(65) Prior Publication Data

US 2018/0115827 A1    Apr. 26, 2018

Related U.S. Application Data

(63) Continuation of application No. PCT/JP2016/066598, filed on Jun. 3, 2016.

(30) Foreign Application Priority Data

Jun. 16, 2015  (JP) .................................. 2015-121465

(51) Int. Cl.
*H04B 1/04*  (2006.01)
*H04L 7/00*  (2006.01)
(Continued)

(52) U.S. Cl.
CPC ................ *H04R 3/12* (2013.01); *H04B 1/04* (2013.01); *H04L 7/00* (2013.01); *H04S 7/00* (2013.01); *H04R 2420/07* (2013.01)

(58) Field of Classification Search
CPC ......... H04B 1/04; H04L 7/00; H04R 2420/07; H04R 3/12; H04S 7/00
(Continued)

(56) References Cited

U.S. PATENT DOCUMENTS

2007/0276524 A1    11/2007 Tokuhara
2008/0037151 A1*    2/2008 Fujimoto ............... G11B 20/10
                                                                        360/18
(Continued)

FOREIGN PATENT DOCUMENTS

EP            3313088 A1     4/2018
JP         2006074374 A      3/2006
(Continued)

OTHER PUBLICATIONS

International Search Report issued in Intl. Appln. No. PCT/JP2016/066598 dated Aug. 23, 2016. English translation provided.
(Continued)

*Primary Examiner* — Vivian C Chin
*Assistant Examiner* — Friedrich Fahnert
(74) *Attorney, Agent, or Firm* — Rossi, Kimms & McDowell LLP (57) ABSTRACT

An output control device includes a signal input unit configured to receive an audio signal; a first output unit configured to output the audio signal to a first reproducing device; a second output unit configured to output the audio signal to a second reproducing device via communication in which a delay of a first delay time period occurs; and a buffer unit configured to temporarily store the audio signal, to read the temporarily-stored signal, and to output the read signal to the first and the second output units. The buffer unit is configured to advance a second read position, which is a read position in the buffer unit of a buffer signal to be output to the second output unit, by the first delay time period ahead of a first read position, which is a read position of a buffer signal to be output to the first output unit.

22 Claims, 4 Drawing Sheets

(51) Int. Cl.
*H04R 3/12* (2006.01)
*H04S 7/00* (2006.01)

(58) Field of Classification Search
USPC .................... 700/94; 455/3.06; 375/316
See application file for complete search history.

(56) References Cited

U.S. PATENT DOCUMENTS

| | | | |
|---|---|---|---|
| 2008/0232175 A1* | 9/2008 | Aoki | G11C 7/1006 365/189.14 |
| 2009/0298420 A1 | 12/2009 | Haartsen et al. | |
| 2011/0182384 A1 | 7/2011 | Iwatsuki et al. | |
| 2012/0084453 A1* | 4/2012 | Buser | H04N 21/2368 709/231 |
| 2012/0130519 A1* | 5/2012 | Choi | H04N 21/42203 700/94 |
| 2015/0245306 A1* | 8/2015 | Boehlke | H04J 3/0664 370/350 |
| 2016/0295539 A1* | 10/2016 | Atti | H04W 56/0045 |
| 2017/0353937 A1* | 12/2017 | Tanaka | H04H 20/18 |

FOREIGN PATENT DOCUMENTS

| | | |
|---|---|---|
| JP | 2007318604 A | 12/2007 |
| JP | 2011151675 A | 8/2011 |
| JP | 2011525068 A | 9/2011 |

OTHER PUBLICATIONS

Written Opinion issued in Intl. Appln. No. PCT/JP2016/066598 dated Aug. 23, 2016.

English translation of Written Opinion issued in Intl. Appln. No. PCT/JP2016/066598 dated Aug. 23, 2016, cited in IDS filed on Dec. 14, 2017.

International Preliminary Report on Patentability issued in Intl. Appln. No. PCT/JP2016/066598 dated Dec. 28, 2017. English translation provided.

Extended European Search Report issued in European Appln. No. 16811472.6 dated Dec. 13, 2018.

Office Action issued in Japanese Appln. No. 2015-121465 dated Dec. 4, 2018. English machine translation provided.

* cited by examiner

OUTPUT CONTROL DEVICE, OUTPUT CONTROL SYSTEM, AND OUTPUT CONTROL METHOD

CROSS-REFERENCE TO RELATED APPLICATION

The present application is continuation of International Application No. PCT/JP2016/066598 filed on Jun. 3, 2016, which claims priority from Japanese Application No. JP2015-121465 filed on Jun. 16, 2015. The contents of these applications are hereby incorporated by reference into this application.

BACKGROUND OF THE INVENTION

1. Field of the Invention

The present invention relates to an output control device, an output control system, and an output control method, and more particularly, to a method of synchronizing and reproducing, for example, an audio signal by a plurality of devices.

2. Description of the Related Art

There has been proposed a system for reproducing an audio signal reproduced by a master audio device by a plurality of other audio devices. In this case, the audio signal may be transmitted from the master device by mutually different transmission lines to the other audio devices (JP 2006-074374 A).

SUMMARY OF THE INVENTION

It is not necessary for the mutually different transmission lines to have the same performance. For example, in many cases, the transmission lines differ from each other in magnitude of delay and transmission rate. There is a problem in that, when the audio signal is input as it is to the plurality of transmission lines thus differing from each other, sound is delayed at a slow line to fail to achieve synchronization. There is also a problem in that reproduction cannot be synchronized with a device that is not managed as a part of a master/slave group.

Therefore, it is an object of one or more embodiments of the present invention to enable synchronized reproduction by a plurality of audio devices by achieving synchronization in accordance with the performance of a transmission line for an audio signal, and to enable synchronized reproduction even by an audio device that cannot be grouped, for example, a product manufactured by a different manufacturer.

An output control device according to one embodiment of the present invention includes: a signal input unit configured to receive an audio signal; a first output unit configured to output the audio signal to a first reproducing device; a second output unit configured to output the audio signal to a second reproducing device via communication in which a delay of a first delay time period occurs; and a buffer unit configured to temporarily store the audio signal, to read the temporarily-stored signal, and to output the read signal to the first output unit and the second output unit, the buffer unit being configured to advance a second read position, which is a read position in the buffer unit of a buffer signal to be output to the second output unit, by the first delay time period ahead of a first read position, which is a read position of a buffer signal to be output to the first output unit.

An output control system according to one embodiment of the present invention includes: an output control device including: a signal input unit configured to receive an audio signal; a first output unit configured to output the audio signal to a first reproducing device; a second output unit configured to output the audio signal to a second reproducing device via communication in which a delay of a first delay time period occurs; and a buffer unit configured to temporarily store the audio signal, to read the temporarily-stored signal, and to output the read signal to the first output unit and the second output unit, the output control device being configured to advance a second read position, which is a read position in the buffer unit of a buffer signal to be output to the second output unit, by the first delay time period ahead of a first read position, which is a read position of a buffer signal to be output to the first output unit; the first reproducing device, which is connected to the output control device and configured to reproduce sound based on the audio signal; and a slave device including the second reproducing device connected to the output control device via a network.

An output control method according to one embodiment of the present invention includes: receiving, by a signal input unit, an audio signal; outputting, by a first output unit, the audio signal to a first reproducing device; outputting, by a second output unit, the audio signal to a second reproducing device via communication in which a delay of a first delay time period occurs; temporarily storing, by a buffer unit, the audio signal, reading the temporarily-stored signal, and outputting the read signal to the first output unit and the second output unit; and advancing, by the buffer unit, a second read position, which is a read position in the buffer unit of a buffer signal to be output to the second output unit, by the first delay time period ahead of a first read position, which is a read position of a buffer signal to be output to the first output unit.

An audio device of one embodiment of the present invention is an audio device to be used in a system, the system including an audio device connected via a network, a first reproducing unit that is connected to the audio device and configured to reproduce sound based on an audio signal, a slave device including a second reproducing unit to be connected to the audio device via the network, and a third reproducing unit that is connected via wireless communication different from the network and configured to reproduce sound from the audio signal. The audio device includes a signal input unit configured to receive the audio signal, a first output unit configured to output the audio signal to the first reproducing unit via a cable, a second output unit configured to output the audio signal to the second reproducing unit via a network in which the audio signal is delayed by a first delay time period compared with the cable, a third output unit configured to output the audio signal to the third reproducing unit via one-to-one wireless communication in which the audio signal is delayed by a second delay time period compared with the cable, and a buffer configured to temporarily store the audio signal, to read the temporarily-stored signal, and to output the read signal to the first output unit, the second output unit, and the third output unit. The buffer is also configured to perform synchronized reproduction by the first reproducing unit, the second reproducing unit, and the third reproducing unit by advancing a second read position, which is a read position of a buffer signal to be output to the second output unit, by the first delay time period and advancing a third read position, which is a read position of a buffer signal to be output to the third output unit, by the second delay time period, ahead of a first read position, which is a read position of a buffer signal to be output to the first output unit.

In each of the above-mentioned inventions, the second delay time period may be set to be the same as the first delay time period, the second read position may be set to be the same as the first read position, and the buffer signal read from the first read position may be output to the first output unit and the second output unit.

In each of the above-mentioned inventions, when the audio signal starts to be output, an amount of silent data equal to a first delay time period Td1 may be written before the buffered audio signal, and reading of the audio signal may be started after the first read position is set to be at a start of the silent data and the second read position is set to be at a start of the buffered audio signal.

In each of the above-mentioned inventions, in a case in which an audio signal is being read only to the first output unit, when reading to the second output unit is to be started during the reading of the audio signal, the following processing is performed. That is, when an audio signal, which is ahead of the first read position (or which is read later), has been buffered for a first delay time period Td1 or more, the second read position is set to a position ahead of the first read position by the first delay time period Td1, and reading of the buffer unit is started from the second read position. the second read position is set to a position furthest (most recent) ahead of the buffered audio signal when a buffer amount of an audio signal ahead of the first read position is less than the first delay time period Td1, reading of a buffer signal is started from the first read position and the second read position after the first read position is moved to a position behind the second read position by the first delay time period Td1 and silent data is written in a buffer area from the previous first read position up to the currently-moved first read position.

In each of the above-mentioned inventions, when the first reproducing unit, the second reproducing unit, and the third reproducing unit have mutually different transmission rates, a first buffer configured to buffer an audio signal for the first reproducing unit, a second buffer configured to buffer an audio signal for the second reproducing unit, and a third buffer configured to buffer an audio signal for the third reproducing unit may be separately arranged in parallel with one another with the first read position being set in the first buffer, the second read position being set in the second buffer, and the third read position being set in the third buffer.

According to one or more embodiments of the present invention, synchronized reproduction can be achieved among, for example, a plurality of grouped audio devices connected via transmission lines having different performances and an ungrouped audio device having an individual connection.

DETAILED DESCRIPTION OF THE INVENTION

Figure 1:
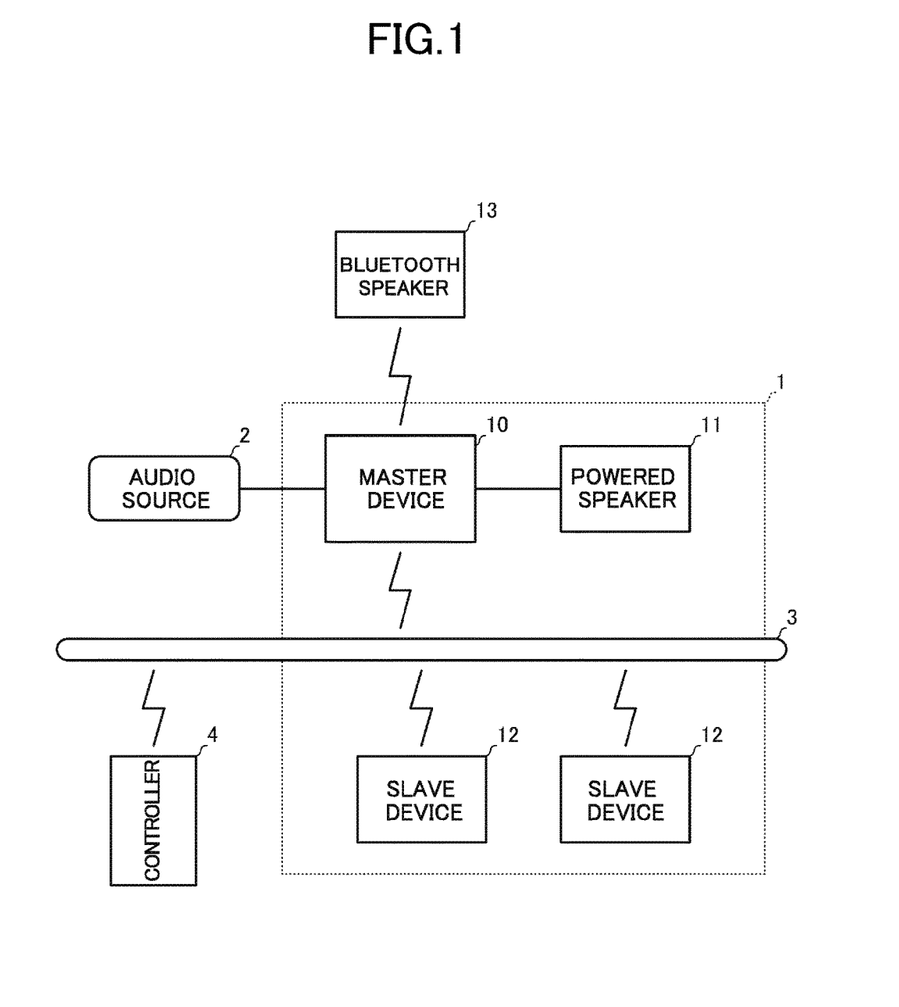
FIG. 1 is a configuration diagram of an audio system of an embodiment of the present invention.
Figure 2:
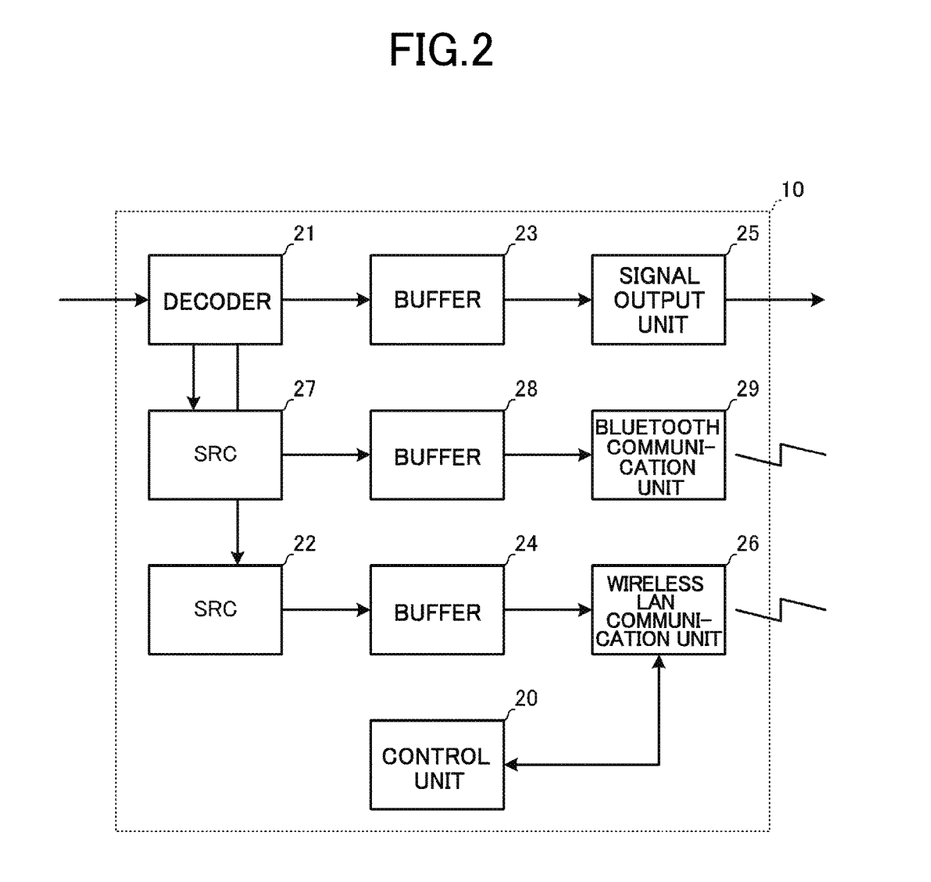
FIG. 2 is a block diagram of a master device of a wireless audio system of the embodiment of the present invention.

FIG. 1 is a configuration diagram of an audio system 1 of an embodiment of the present invention. FIG. 2 is a block diagram of a master device 10.

The audio system 1 includes a master device 10, a powered speaker 11 (first reproducing device), and one or a plurality of slave devices 12 (second reproducing device). The master device 10 and the slave device(s) 12 are controlled by a controller 4 via a network 3. The controller 4 may be constructed of, for example, a smartphone application, a personal computer, or a dedicated remote controller. The master device 10 and the slave device(s) 12 are grouped together. An audio signal reproduced by the master device 10 is synchronized and emitted as sound by the slave device(s) 12 as well. A speaker device (Bluetooth (trademark) speaker) 13 (third reproducing device), which is not a part of the group, is connected to the master device 10 via Bluetooth, which is a type of one-to-one communication. The master device 10 transmits the reproduced audio signal to the speaker device 13 via Bluetooth, and the speaker device 13 also emits the audio signal as sound at an almost synchronous timing. The master device 10 and the speaker device 13 may be connected via wireless communication other than Bluetooth, as long as the wireless communication is different from a type of communication employed by the network for connecting the master device 10 and the slave device(s) 12.

An audio source 2 is supplied to the master device 10. The master device 10 is, for example, a receiver configured to amplify the input audio source 2 and to output the amplified audio source 2 to the powered speaker 11. The master device 10 and the powered speaker 11 are connected via, for example, a digital cable, and are capable of transmitting a high-quality digital signal. The powered speaker 11 receives a high-quality audio signal, decodes and converts the audio signal into analog, and then amplifies and emits the analog signal as sound. The slave device(s) 12 are, for example, wireless speakers, and are connected to the master device 10 via the network 3. The network 3 may include a wireless LAN, such as Wi-Fi. A medium-quality audio signal is transmitted to the slave device(s) 12 from the master device 10. The master device 10 transmits the audio signal by a unicast method (e.g., TCP) for controlling retransmission to the slave device(s) 12 in order to ensure synchronized reproduction of medium-quality sound. In FIG. 1, two slave devices 12 are illustrated, but it is possible for up to nine slave devices 12 to be connected to one master device 10. The master device 10 and the slave device(s) 12 can also transmit a pseudo-synchronous audio signal via Bluetooth communication to the speaker device 13, which is a device that is external to the audio system 1 (i.e., is not grouped). In this case, the high-quality audio signal refers to, for example, a "192 kbps/24 bit" signal, and the medium-quality audio signal refers to, for example, a "48 kbps/24 bit" signal. The medium-quality audio signal to be transmitted to the slave device(s) 12 and the medium-quality audio signal to be transmitted to the speaker device 13 may be the same, or may differ in bit rate or quantization bit rate. The master device 10 may include the first reproducing device 11. The master device 10 may be configured to output an analog signal via an analog cable, and to input the analog signal to a passive speaker. In this embodiment, the connection relation between the master device 10 and the first to third reproducing devices is not limited to the relation described above, and the quality of the audio signal to be transmitted is also not limited to that described above. For example, the master device 10 and the slave device(s) 12 may be connected by using a wired LAN. Regarding the quality of the audio signal for the first to third reproducing devices, for example, the master device 10 may transmit a medium-quality audio signal to the first reproducing device and transmit a low-quality audio signal to the second and third reproducing devices, or may transmit a high-quality audio signal to the first and second reproducing devices and transmit a low-quality signal to the third reproducing device. It is preferred that the highest-quality audio signal be transmitted to the first reproducing device, and that a signal that has a lower quality than the signal to be transmitted to the first reproducing device be transmitted to the second or third reproducing device.

The audio source 2 is supplied from, for example, a DLNA (trademark)) server or a storage medium (e.g., hard disk drive or semiconductor memory) connected via a USB. The file format of the audio source 2 to be supplied is, for example, a FLAC file that satisfies the conditions for a high-quality audio signal (of 192 kbps/24 bit).

FIG. 2 is a block diagram of the receiver, which is the master device 10. The master device 10 includes a control unit 20, a decoder 21, a sampling rate converter (SRC) 22, 27, buffers 23, 24 and 28, a signal output unit 25 (first output unit), and a wireless LAN communication unit 26 (second output unit). The control unit 20 controls the overall device in accordance with commands from the controller 4. The decoder 21 receives and decodes the audio source 2 (e.g., FLAC file) into a streaming signal. This streaming audio signal is a high-quality (192 kbps/24 bit) signal. The decoded audio signal is input to the buffer 23, and is also input to the sampling rate converter 22 and a sampling rate converter 27. The sampling rate converter 22 converts the input high-quality audio signal (of 192 kbps/24 bit) into a medium-quality audio signal (of, for example, 48 kbps/16 bit). The converted audio signal is input to the buffer 24. The sampling rate converter 27 converts the input high-quality audio signal into a medium-quality audio signal. The converted audio signal is input to a buffer 28. Therefore, in the case of converting audio signals having about the same quality, the output of the SRC 27 can be input to the buffer 24, and the SRC 22 can be omitted.

Figure 3:
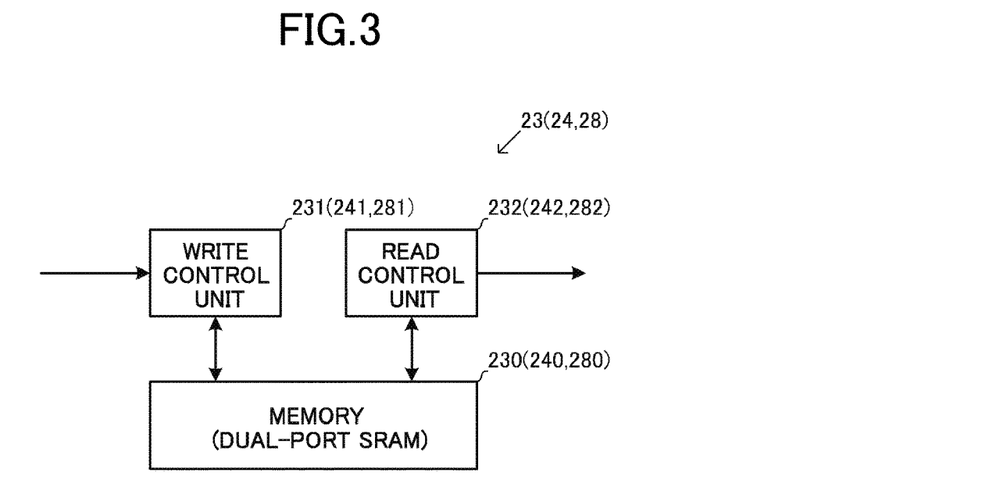
FIG. 3 is a configuration diagram of a buffer of the master device.

As illustrated in FIG. 3, the buffer 23 (24, 28) includes a memory 230 (240, 280), a write control unit 231 (241, 281), and a read control unit 232 (242, 282). The memory 230 (240, 280) is a dual-port SRAM. The write control unit 231 (241, 281) writes the audio signal from one of the dual ports, and the read control unit 232 (242, 282) reads the written audio signal from the other of the dual ports. The details of procedures for the writing and the reading are described later with reference to FIG. 4 and FIGS. 5A, B, C, and D. The signal output unit 25 outputs, to the powered speaker 11, the high-quality audio signal read from the buffer 23. The signal output unit 25 and the powered speaker 11 are connected via a digital cable, which enables a high-quality signal to be transmitted with no delay.

The wireless LAN communication unit 26 transmits the medium-quality audio signal read from the buffer 24 to the slave device(s) 12 via the network 3 (wireless LAN). As described above, communication to/from the slave device(s) 12 is performed by unicast, and hence the number of audio signals transmitted by the wireless LAN communication unit 26 to the network 3 is equal to the number of slave devices 12. As a result, the transmission of the audio signal to each slave device 12 via the network 3 is delayed compared with the transmission to the powered speaker 11 via the digital cable. The buffers 23 and 24 absorb this delay to enable synchronized reproduction by the powered speaker 11 and the slave device(s) 12. A Bluetooth communication unit 29 transmits the audio signal read from the buffer 28 to the speaker device 13 via Bluetooth one-to-one communication. In Bluetooth, the delay may vary depending on the profile, but the maximum delay is about 0.2 second. However, an attempt to completely resolve this delay leads to a deterioration in operation response of the overall audio system 1. Therefore, during reproduction of the audio signal, in the buffer 28 corresponding to the Bluetooth speaker device 13, a read position T3 that is shifted by a predetermined delay time period (about 0.05 second) from a read position T1 of the buffer 23 corresponding to the powered speaker 11 is set in a fixed manner to absorb the delay. On the other hand, when the reproduction of the audio signal is started with the speaker device 13 being connected, and when the speaker device 13 is connected during the reproduction of the audio signal, in order to prevent a delay or sound cutting out during the reproduction by the audio system 1, the transmission to the speaker device 13 is started after the audio signal has accumulated in the buffer 28 without a change being made to the read positions in the buffers 23 and 24.

In order to buffer a high-quality audio signal in the buffer 23, the memory 230 correspondingly has a large capacity. The memory 240 of the buffer 24 and the memory 280 of the buffer 28 are each set to have a capacity that matches the sound quality. Audio signals corresponding to the same time are input in parallel to the buffers 23, 24, and 28 from the decoder 21 and the sampling rate converters 22 and 27. The processing speed of the decoder 21 and the sampling rate converters 22 and 27 is faster than the reproduction speed of the audio signals, and hence the decoder 21 and the sampling rate converters 22 and 27 operate as appropriate while monitoring the buffer amounts of the buffers 23, 24, and 28. For example, when the buffer amounts decrease, the write control units 231, 241, and 281 output a buffer underrun warning to the decoder 21 and the sampling rate converters 22 and 27, and in response to this warning, the decoder 21 and the sampling rate converters 22 and 27 restart processing. The read control units 232, 242, and 282 read the audio signal at the reproduction speed of the audio signal from the memories 230, 240, and 280, and output the audio signal to the subsequent stages being the signal output unit 25, the wireless LAN communication unit 26, and the Bluetooth communication unit 29, respectively. The data amounts to be read per unit time from the buffers 23, 24, and 28 and the data amounts required for reproduction per unit time are different from one another depending on, for example, the bit rate and the quantization bit rate of the audio signal. Therefore, the write control units 231, 241, and 281 and the read control units 232, 242, and 282, respectively, perform mutually different kinds of write/read pointer control in consideration of the size of that data.

Figure 4:
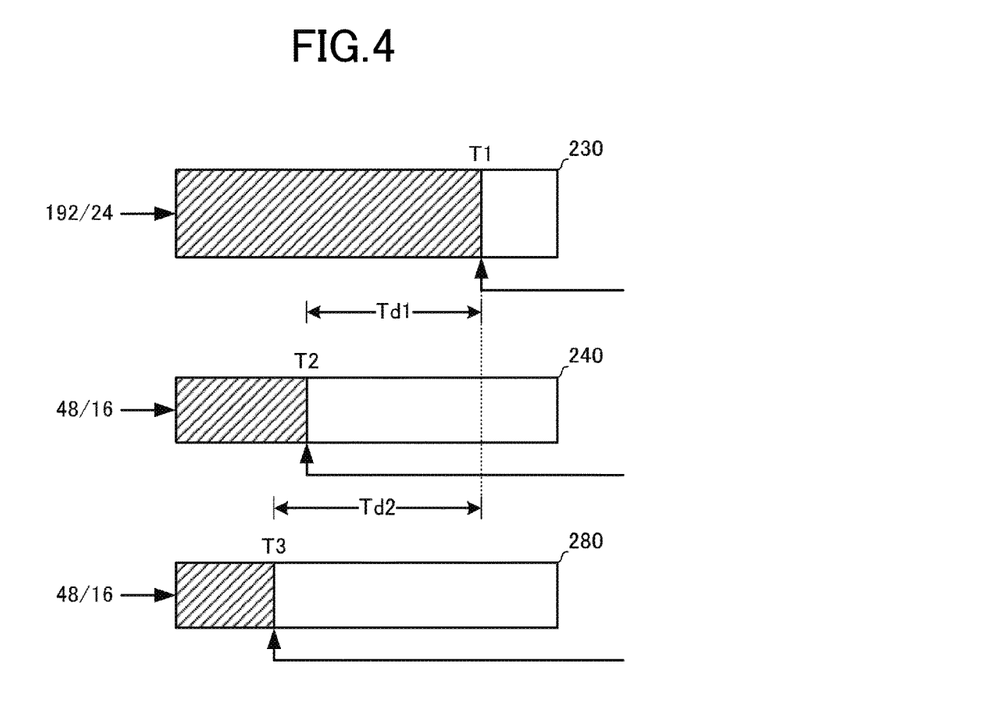
FIG. 4 is a diagram for illustrating a read method of the buffer.

A method of reading the audio signals to be buffered in the buffers 23, 24, and 28 is now described with reference to FIG. 4 and FIG. 5. In FIG. 4, there is illustrated a basic mode of the read method. The read control unit 232 of the buffer 23 reads the audio signal corresponding to a time T1 (first read position). Because a "signal output unit 25-powered speaker 11" signal transmission line (line A) has almost no delay, T1 is a position at which sound is emitted almost exactly at that time. More specifically, at the time T1, the audio signal at the position of T1 is reproduced and emitted as sound. On the other hand, the read control unit 242 of the buffer 24 reads the audio signal corresponding to a time T2 (second read position), which is ahead of T1 (or at which the reproduction is performed later than T1) by an amount Td1, and the read control unit 282 of the buffer 28 reads the audio signal corresponding to a time T3 (third read position), which is ahead of T1 by an amount Td2. Because a slight delay occurs in a "wireless LAN communication unit 26-slave device 12" signal transmission line (line B), an audio signal ahead by the delay time period Td1 is read and transmitted to the slave device(s) 12, which enables the reproduction of an audio signal that has been synchronized between the powered speaker 11 and the slave device(s) 12. More specifically, from the time T2 onward, the audio signal of from T2 onward within the buffers 23 and 24 is reproduced in the line A and the line B in synchronization. Delays occur as a result of, for example, wireless LAN congestion, retransmission control, and the throughput of the low-cost slave device(s) 12. Further, in a "Bluetooth communication unit 29-speaker device 13" signal transmission line (line C), because the Bluetooth causes a delay depending on the profile occurs, an audio signal ahead by that delay time period Td2 is read and transmitted to the speaker device 13, which enables the audio signal to be reproduced by the speaker device 13 almost in synchronization with the powered speaker 11 and the slave device(s) 12. More specifically, from the time T3 onward, the audio signal of from T3 onward within the buffers 23, 24, and 28 is reproduced in the line A, the line B, and the line C in synchronization. During synchronized reproduction, the amount of buffered data in the buffers 23, 24, and 28 fluctuates based on the intermittent operation of the decoder 21 and the sampling rate converters 22 and 27, but reading continues while maintaining time differences between the read position T1 and the read positions T2 and T3 to Td1 and Td2, respectively.

As described above, for the speaker device 13 to be externally connected to the audio system 1, during the reproduction of the audio signal, reading is performed from the read position T3, which is determined by considering delay. However, when the reproduction is started or when the speaker device 13 is connected during the reproduction, for example, special processing is not performed for this line C, and transmission to the speaker device 13 is started at the point when the audio signal has been sufficiently buffered in the buffer 28. As another processing method, the processing may be simplified by performing the same control for the ungrouped speaker device 13 as for the grouped slave device(s) 12 by, for example, setting Td2 to be equal to Td1 and transmitting the audio signal read from the buffer 24 as it is from the Bluetooth communication unit 29, or performing the same processing for buffer 28 as for the buffer 24.

Figure 5A:
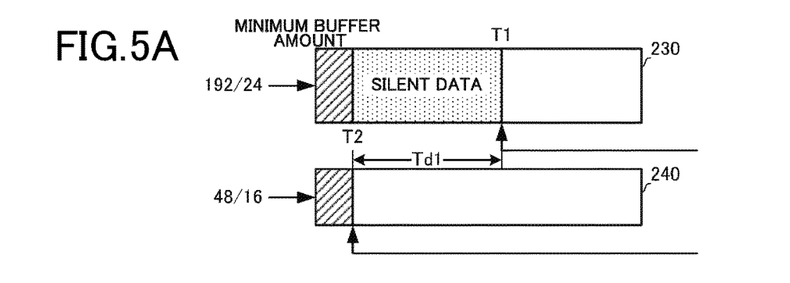
FIGS. 5A, B, C, and D are diagrams for illustrating a read method of the buffer.

FIG. 5A is a diagram for illustrating processing performed when synchronized reproduction is started. The processing illustrated in FIG. 5A is performed when synchronized reproduction is performed by the powered speaker 11 and the slave device(s) 12 from a reproduction start time of the audio source 2 (e.g., from a start of a song). (Because the line C of FIG. 5A is obtained only by changing the delay time period from Td1 to Td2, a description thereof is omitted.) First, before starting the reproduction, an amount of silent data (0 data) equal to the delay time period Td1 is written in the buffer 23 for the line A. This is performed in order to synchronize the read position T1 in the line A with a position that is behind the read position T2 in the line B by the amount Td1 at a point when there has been no previous audio signal, that is, at the start of a song. Then, when the minimum amount of the audio signal required to start reproduction is buffered, reading (reproduction) of the silent data is started from the read position T1. The buffer 24 in the line B starts reading from the start of the audio signal, and the buffer 23 in the line A starts reading from the start of the silent data that is behind by the amount Td1 compared with the line B. The powered speaker 11 in the line A reproduces the silent data for the time Td1, and then the audio signal is reproduced from the actual start of the audio signal. At the slave device(s) 12, reproduction is started by delaying the start of the audio signal read from the buffer 24 by the time Td1 for the purpose of transmission and reproduction. As a result, from that point on, synchronized reproduction is performed by the powered speaker 11 and the slave device(s) 12. After that, when the audio signal is sufficiently buffered in the buffer 28, synchronized reproduction is also started by the speaker device 13.

Figure 5B:
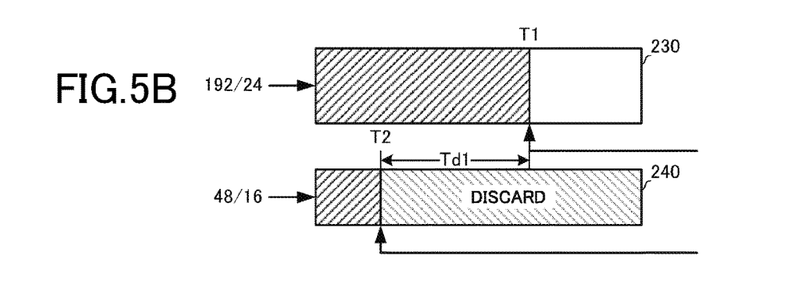
Figure 5C:
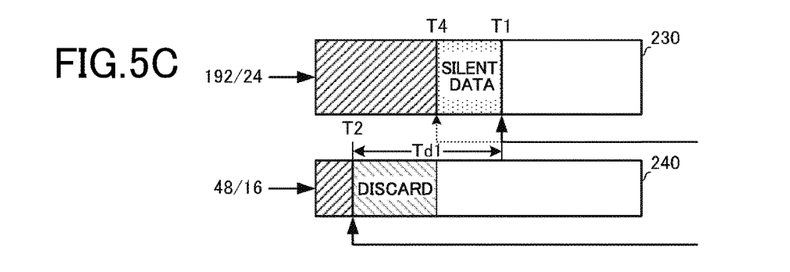

FIG. 5B and FIG. 5C are diagrams for illustrating processing when synchronized reproduction by the slave device(s) 12 (line B) and the speaker device 13 (line C) is to be started during the reproduction of the audio signal by the powered speaker 11 (line A). (Because the line C of FIG. 5B and FIG. 5C is obtained only by changing the delay time period from Td1 to Td2, a description thereof is omitted.) In FIG. 5B, there is illustrated a read mode employed when the audio signal is sufficiently buffered, and synchronized reproduction by the slave device(s) 12 can start while continuing reproduction by the powered speaker 11. In FIG. 5C, there is illustrated a read mode employed when the buffer amount of the audio signal is not sufficient, and synchronized reproduction with the slave device(s) 12 is started by temporarily halting reproduction by the powered speaker 11. Even when reproduction is not being performed by the slave device(s) 12, the audio signal is continuously written in the buffer 24 from the sampling rate converter 22, and the buffered audio signal is discarded (overwritten) in order from the oldest data without being read.

In FIG. 5B, when an instruction for reproduction by the slave device(s) 12 is input from the controller 4 while the audio signal is being output to the powered speaker 11 from the signal output unit 25, the read position in the buffer 23 at that point is referred to, and the reading of the buffer 24 starts from a position ahead of the position by the amount Td1. The buffer data of the buffer 24 before that read position is discarded. Through transmitting the audio signal read from the buffer 24 to the slave device(s) 12 via the network 3, synchronized reproduction is started by the slave device(s) 12 during the reproduction (after time Td2) by the powered speaker 11 without the reproduction sound of the powered speaker 11 cutting out. Similarly, at the buffer 28 (not shown) as well, reading of the buffer 28 is started from a position ahead by the amount Td2 from T1, and the data from before the read position is discarded. Similarly to the slave device(s) 12, for the speaker device 13 as well, almost synchronized reproduction is started after a delay by a time of Td2.

Figure 5D:
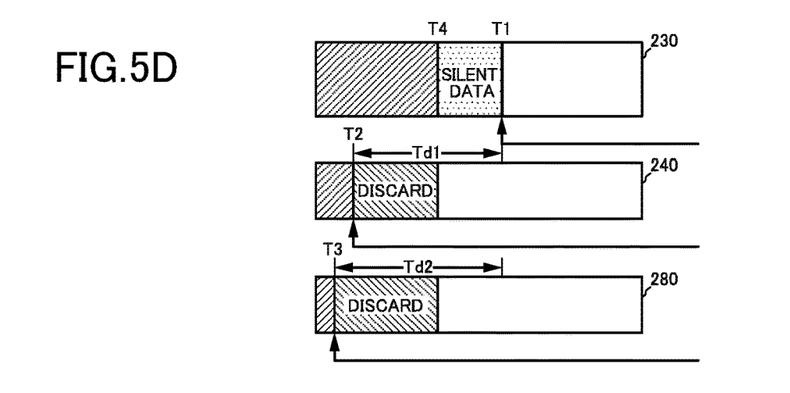

In FIG. 5C, the following processing is performed in a case where the buffer amounts of the buffers 23 and 24 are not sufficient to start synchronized reproduction when the instruction for reproduction by the slave device(s) 12 is input from the controller 4 while the audio signal is being output to the powered speaker 11 from the signal output unit 25. Specifically, when a minimum buffer amount cannot be secured by advancing from a read position T4 of the buffer 23 by the amount Td1 in the buffer 24, the read position T2 (second read position) of the buffer 24 is set to a minimum buffer position T2. As a result, the read position in the buffer 23 becomes T1, which is a position behind T2 by the amount Td1, but the audio signal at that position has already been read. Therefore, silent data is additionally written from T4 to the currently-moved read position T1. Then, reading from the read positions T1 and T2 is simultaneously started at the buffers 23 and 24. Therefore, at the buffer 23, first, the silent data for repeating the already-reproduced section from T1 to T4 is read, and as a result the sound from the powered speaker 11 momentarily cuts out. Then, the audio signal corresponding to the time from T4 to T2 is reproduced by the powered speaker 11 alone, and from the time T2 onward synchronized reproduction by the powered speaker 11 and the slave device(s) 12 is started. In the case illustrated in FIG. 5C, an operation for the line C is handled by considering Td1 and Td2 to be equal, and also at the speaker device 13, reproduction that is almost in synchronization with the powered speaker 11 is started from the time T2 onward. In the above example, as illustrated in FIG. 5D, the following processing is performed when the buffer amounts of the buffers 23, 24, and 28 are insufficient for starting synchronized reproduction. That is, for example, when the minimum buffer amount cannot be secured by advancing from the read position T4 of the buffer 23 when the reproduction instruction has been input by the amount Td2 at the buffer 28 of the signal line (line C) having the largest delay, the read position in the buffer 28 (third read position) is set to the minimum buffer position T3. In other words, the configuration in the present invention is configured so that, when a plurality of buffers are present, the minimum buffer amount can be secured by the buffer of the signal line having the largest delay. In the same manner as described above, silent data is additionally written in the period between T1, which is a position behind the read position T3 of the buffer by the amount Td2, and the read position T4 of the buffer 23 when the reproduction input was input. Regarding the buffer 24, reading of the buffer 24 is started from the position ahead of T1 by the amount Td1.

The delay time period Td1 can be set in advance in the master device 10 when shipped from the factory, or can be set by the user by estimating a synchronization difference while listening to the reproduced sound. When synchronization of an internal time is achieved between the master device 10 and the slave device(s) 12, adding a reproduction time (absolute time) of the audio signal by a time stamp, setting of the delay time period Td1 does not need to be highly accurate.

In the embodiment described above, the powered speaker 11 is connected to the master device 10 by a digital cable. However, the powered speaker 11 can be connected to the master device 10 via the network 3 in the same manner as the slave device(s) 12 (i.e., as one of the slave devices 12).

In FIG. 5C, when the buffer amounts of the buffers 23 and 24 are insufficient, silent data is written into the buffer 23. However, synchronized reproduction can also be started after the decoder 21 and the sampling rate converter 22 have been activated and a sufficient buffer amount of the audio signal has accumulated (i.e., after reaching the state of FIG. 5B).

While there have been described what are at present considered to be certain embodiments of the invention, it will be understood that various modifications may be made thereto, and it is intended that the appended claims cover all such modifications as fall within the true spirit and scope of the invention.

What is claimed is:

1. An output control device, comprising:
a signal input unit configured to receive an audio signal;
a first output unit configured to output the audio signal to a first reproducing device;
a second output unit configured to output the audio signal to a second reproducing device via communication in which a delay of a first delay time period occurs; and
a buffer unit configured to temporarily store the audio signal, to read the temporarily-stored signal, and to output the read signal to the first output unit and the second output unit,
the buffer unit being configured to include a first read position, which is a read position of a buffer signal to be output to the first output unit, and a second read position, which is a read position in the buffer unit of a buffer signal to be output to the second output unit, and
to advance the second read position ahead of the first read position by a first delay time period,
wherein the buffer unit is configured to write, when the audio signal starts to be output, an amount of silent data equal to the first delay time period before the buffered audio signal, and to start reading of the audio signal after setting the first read position to be at a start of the silent data and the second read position to be at a start of the buffered audio signal.

2. The output control device according to claim 1, further comprising a third output unit configured to output the audio signal to a third reproducing device via communication in which a delay of a second delay time period occurs,
wherein the buffer unit is further configured to temporarily store the audio signal, to read the temporarily-stored signal, and to output the read signal to the third output unit, and
wherein the buffer unit is configured to advance the second read position, and a third read position, which is a read position of a buffer signal to be output to the third output unit, by the first delay time period and the second delay time period, respectively, ahead of the first read position.

3. The output control device according to claim 2, wherein the second output unit is connected to the first reproducing device via a network, and the third output unit is connected via wireless communication different from the network.

4. The output control device according to claim 2, wherein the buffer unit is configured to set the second delay time period to be the same as the first delay time period, to set the second read position to be the same as the first read position, and to output the buffer signal read from the first read position to the first output unit and the second output unit.

5. The output control device according to claim 2,
wherein the first reproducing device, the second reproducing device, and the third reproducing device have mutually different transmission rates,
wherein a first buffer configured to buffer an audio signal for the first reproducing device, a second buffer configured to buffer an audio signal for the second reproducing device, and a third buffer configured to buffer an audio signal for the third reproducing device are separately arranged in parallel with one another, and
wherein the first read position is set in the first buffer, the second read position is set in the second buffer, and the third read position is set in the third buffer.

6. The output control device according to claim 2, wherein the third reproducing device is not grouped with the first reproduction device and the second reproduction device; and the third reproduction device synchronously reproduces with the first reproduction device and second reproduction device under the control of the buffer unit.

7. The output control device according to claim 1, wherein the second output unit is connected to the first reproducing device via a network.

8. The output control device according to claim 7, wherein the network is a wireless network.

9. The output control device according to claim 1, wherein the buffer unit is configured to advance, in a case in which an audio signal is being read only to the first output unit, when reading to the second output unit is to be started during the reading of the audio signal, the second read position to a position ahead of the first read position by the first delay time period when an audio signal ahead of the first read position has been buffered for the first delay time period or more, and to start reading of the buffer unit from the second read position.

10. The output control device according to claim 1, wherein the buffer unit is configured to advance, in a case in which an audio signal is being read only to the first output unit, when reading to the second output unit is to be started during the reading of the audio signal, the second read position to a position furthest ahead of the buffered audio signal when a buffer amount of an audio signal ahead of the first read position is less than the first delay time period, and to start reading of a buffer signal of the buffer unit from the first read position and the second read position after moving the first read position to a position behind the second read position by the first delay time period and writing silent data in a buffer area from the previous first read position up to the moved first read position.

11. The output control device according to claim 1, further comprising the first reproducing device.

12. The output control device according to claim 1, wherein
the first output unit is configured to output the audio signal to the first reproducing device at a first sampling rate; and
the second output unit is configured to output the audio signal to the second reproducing device at a second sampling rate.

13. The output control device according to claim 12, wherein the first sampling rate is higher than the second sampling rate.

14. The output control device according to claim 1, wherein the first reproducing device controls the second reproducing device to form a synchronized reproduction.

15. An output control system, comprising:
an output control device including:
a signal input unit configured to receive an audio signal;
a first output unit configured to output the audio signal to a first reproducing device;
a second output unit configured to output the audio signal to a second reproducing device via communication in which a delay of a first delay time period occurs; and
a buffer unit configured to temporarily store the audio signal, to read the temporarily-stored signal, and to output the read signal to the first output unit and the second output unit,
the output control device being configured to include a first read position, which is a read position of a buffer signal to be output to the first output unit, and a second read position, which is a read position in the buffer unit of a buffer signal to be output to the second output unit, and
advance the second read position ahead of the first read position by a first delay time period,
wherein the buffer unit is configured to write, when the audio signal starts to be output, an amount of silent data equal to the first delay time period before the buffered audio signal, and to start reading of the audio signal after setting the first read position to be at a start of the silent data and the second read position to be at a start of the buffered audio signal, and
the first reproducing device, which is connected to the output control device and configured to reproduce sound based on the audio signal; and
a slave device including the second reproducing device connected to the output control device via the communication.

16. An output control method, comprising:
receiving, by a signal input unit, an audio signal;
outputting, by a first output unit, the audio signal to a first reproducing device;
outputting, by a second output unit, the audio signal to a second reproducing device via communication in which a delay of a first delay time period occurs;
temporarily storing, by a buffer unit, the audio signal, reading the temporarily-stored signal, and outputting the read signal to the first output unit and the second output unit;
including a first read position, which is a read position of a buffer signal to be output to the first output unit, and a second read position, which is a read position in the buffer unit of a buffer signal to be output to the second output unit,
advancing the second read position ahead of the first read position by a first delay time period, and
writing, by the buffer unit, when the audio signal starts to be output, an amount of silent data equal to the first delay time period before the buffered audio signal, and starting reading of the audio signal after setting the first read position to be at a start of the silent data and the second read position to be at a start of the buffered audio signal.

17. The output control method according to claim 16, further comprising:
outputting, by a third output unit, the audio signal to a third reproducing device via communication in which a delay of a second delay time period occurs;
temporarily storing, by the buffer unit, the audio signal, reading the temporarily-stored signal, and outputting the read signal to the third output unit; and
advancing, by the buffer unit, the second read position and a third read position, which is a read position of a buffer signal to be output to the third output unit, by the first delay time period and the second delay time period, respectively, ahead of the first read position.

18. The output control method according to claim 17, wherein the second output unit is connected to the first reproducing device via a network, and the third output unit is connected via wireless communication different from the network.

19. The output control method according to claim 17, further comprising setting, by the buffer unit, the second delay time period to be the same as the first delay time period, setting the second read position to be the same as the first read position, and outputting the buffer signal read from the first read position to the first output unit and the second output unit.

20. The output control method according to claim 16, wherein the second output unit is connected to the first reproducing device via a network.

21. The output control method according to claim 16, further comprising setting, by the buffer unit, in a case in which an audio signal is being read only to the first output unit, when reading to the second output unit is to be started during the reading of the audio signal, the second read position to a position ahead of the first read position by the first delay time period when an audio signal ahead of the first read position has been buffered for the first delay time period or more, and starting reading of the buffer unit from the second read position.

22. The output control method according to claim 16, further comprising setting, by the buffer unit, in a case in which an audio signal is being read only to the first output unit, when reading to the second output unit is to be started during the reading of the audio signal, the second read position to a position furthest ahead of the buffered audio signal when a buffer amount of an audio signal ahead of the first read position is less than the first delay time period, and starting reading of a buffer signal of the buffer unit from the first read position and the second read position after moving the first read position to a position behind the second read position by the first delay time period and writing silent data in a buffer area from the previous first read position up to the moved first read position.

* * * * *